(12) United States Patent
Zhang et al.

(10) Patent No.: US 8,512,838 B2
(45) Date of Patent: Aug. 20, 2013

(54) LAMINAR ARTICLES WITH GOOD HYDROCARBON BARRIER

(75) Inventors: David D. Zhang, Wilmington, DE (US); Elizabeth R. Griffin, Newark, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 554 days.

(21) Appl. No.: 12/624,229

(22) Filed: Nov. 23, 2009

(65) Prior Publication Data

US 2010/0129576 A1     May 27, 2010

Related U.S. Application Data

(60) Provisional application No. 61/116,783, filed on Nov. 21, 2008.

(51) Int. Cl.
*B29C 47/00*     (2006.01)

(52) U.S. Cl.
USPC ........ 428/36.7; 428/35.7; 428/36.6; 428/516; 428/518; 428/520; 428/475.8; 428/476.9; 264/171.1; 264/211

(58) Field of Classification Search
USPC .............. 428/36.7, 349, 35.2, 35.7, 516, 518, 428/520, 475.8, 476.9; 524/425, 522
See application file for complete search history.

(56) References Cited

U.S. PATENT DOCUMENTS

| | | |
|---|---|---|
| 4,410,482 A | 10/1983 | Subramanian |
| 4,416,942 A | 11/1983 | DiLuccio |
| 4,444,817 A | 4/1984 | Subramanian |
| 4,950,513 A | 8/1990 | Mehra |
| 4,971,864 A | 11/1990 | McCord |
| 5,053,258 A | 10/1991 | Booze |
| 5,085,816 A | 2/1992 | McCord |
| 5,330,696 A | 7/1994 | Mehra |
| 5,352,735 A | 10/1994 | Hofmann |
| 5,399,619 A | 3/1995 | Torradas |
| 5,443,867 A | 8/1995 | Mehra |
| 5,472,784 A | 12/1995 | Roeber et al. |
| 5,641,833 A | 6/1997 | Jung |
| 5,700,412 A | 12/1997 | Mehra |
| 5,712,043 A | 1/1998 | Chen |
| 5,939,158 A | 8/1999 | Plotzker |
| 6,576,181 B1 | 6/2003 | Yeh |
| 7,737,210 B2 * | 6/2010 | Feinberg ........................ 524/522 |

FOREIGN PATENT DOCUMENTS

| | | |
|---|---|---|
| EP | 0015556 A1 | 9/1980 |
| EP | 0336680 A2 | 10/1989 |
| EP | 0336680 A3 | 10/1989 |
| WO | 93/02138 A | 2/1993 |

\* cited by examiner

*Primary Examiner* — Ellen S Raudenbush

(57) ABSTRACT

Disclosed is a laminar shaped article comprising a heterogeneous blend of (a) a composition comprising a vinyl halide or vinylidene halide polymer and optionally an ethylene copolymer containing carboxyl and/or carbon monoxide moieties, and (b) a polyolefin functionalized with a comonomer selected from the group consisting of maleic anhydride, maleic acid diesters, maleic acid monoesters, itaconic anhydride, itaconic acid diesters, itaconic acid monoesters, fumaric acid diesters, fumaric acid monoesters, or combinations thereof as a compatibilizer; and (c) a polyamide wherein the polyamide is present in the vinyl halide or vinylidene halide polymer as a multitude of overlapping layers.

18 Claims, No Drawings

LAMINAR ARTICLES WITH GOOD HYDROCARBON BARRIER

This application claims priority to U.S. provisional application No. 61/116,783, filed Nov. 21, 2008; the entire disclosure of which is incorporated herein by reference.

The invention relates to a laminar article prepared from polyvinyl chloride, polyamide and compatibilizer.

BACKGROUND OF THE INVENTION

Roofs having single-ply roofing membranes are so named to contrast them with another group of commercial roofing products known as built-up roofing. Built-up roofs are constructed on the roof by the contractor using component materials such as felts and asphalt. As such, they are subject to the problems caused by weather, worker error, and material inconsistencies. Single ply membrane roofing systems using EPDM (ethylene propylene diene monomer) rubber, polyvinylchloride (PVC), and other synthetic material single layer sheets as the top layer of water impervious material were introduced on a large scale to the roofing industry several years ago. The single ply membrane roofing systems are used for flat or low pitched roofs, such as are found in most large commercial buildings such as office buildings, shopping centers and the like. The use of such single ply membranes is increasing due to their inherent advantages over older systems, such as built up roofs formed of layers of tar and paper material, because of weathering and the lower roof loading weights and the savings in costs for an installed roof. Single-ply membranes are flexible sheets of compounded synthetic materials that are manufactured in a factory to strict quality control requirements that minimize the risks inherent in built-up roof systems. Primary among the many physical and performance properties these materials provide are strength, flexibility, and long-lasting durability. The inherent advantages of prefabricated sheets are the consistency of the quality of the products that are manufactured, the versatility in their attachment methods, and therefore, their broader applicability. They are inherently flexible, used in a variety of attachment systems, and compounded for long lasting durability and watertight integrity for years of roof life.

Single-ply roofing membranes include thermoplastic membranes that are based on elastomeric polymers that may be processed as plastics. The most common thermoplastic is PVC, which has been made flexible through the inclusion of plasticizers. Thermoplastic membranes are identified by seams that are formed using either heat (i.e., RF welding or hot air) or chemical fusion (using solvent-borne cements). The resulting seams are as strong as or stronger than the membrane itself. Many thermoplastic membranes are manufactured to include a reinforcement layer such as polyester or fiberglass to provide increased strength and dimensional stability.

PVC membranes have also been used in other applications, such as geotextile membranes. A disadvantage to using PVC in roofing and other applications is their relatively high permeability to organic liquids. A method to reduce permeability of PVC membranes is to include another high-barrier polymer (e.g., polyamides and ethylene vinyl alcohol copolymers) in the membrane.

One approach is to prepare a multilayer membrane structure. The multilayer structure is made of at least two discrete, continuous layers of different polymers, including PVC as at least one of the layers, and is prepared by processes such as coextrusion, extrusion coating, lamination, and the like. This approach requires multiple extruders and often multiple operations to build up the structure, leading to higher costs.

Another method is to prepare melt blends of the different polymers. In many cases, the high-barrier polymer is not fully compatible or miscible with the PVC and heterogeneous blends result. In a heterogeneous blend, one of the polymers forms a continuous phase and the other polymer forms discrete regions or particles distributed throughout the blend (dispersed phase). If the PVC is the continuous phase and the amount of the high-barrier polymer is low, pathways for organic materials to permeate through the PVC phase may exist in the membrane. Accordingly, such blends require relatively large amounts of the high-barrier polymer in order to provide adequate barrier performance.

U.S. Pat. No. 5,352,735 discloses melt blends of halide polymers such as polyvinylchloride and polyamide at a temperature of no greater than about 220° C. and wherein the polyamide has a processing temperature no greater than the temperature of melt blending. The melt blend also incorporates a carboxyl and/or CO-functional ethylene polymer that compatibilizes the PVC and polyamide one with the other.

An alternate solution involves the use of laminar shaped articles. Laminar shaped articles are prepared from a melted, heterogeneous blend of two incompatible polymers and optionally a third polymer that is extended or stretched, such as in a blow molding or blown film operation. One of the incompatible polymers forms a continuous matrix phase. The other incompatible polymer forms a discontinuous distributed phase in which that polymer is present as a multitude of thin, substantially two dimensional, parallel and overlapping layers embedded in the continuous phase. Frequently, a third polymer is included as a compatibilizer to improve adhesion between the layers of the incompatible polymers so that the article has sufficient resistance to delamination. Laminar articles may be prepared using one extruder in a single operation, offering potentially significant advantages over multilayer structures in terms of reduced cost and complexity. Laminar compositions may also use less of the high-barrier polymer than ordinary melt blends to achieve the same level of barrier performance.

Laminar shaped articles prepared from a polyolefin and one or more polymers such as polyamide, polyester, or other polymers have been disclosed. See, e.g., U.S. Pat. Nos. 4,416, 942, 4,444,817, 4,971,864, 5,085,816, 5,330,696, 5,399,619, 5,443,867, 5,641,833, and 5,700,412. See also U.S. Pat. Nos. 5,053,258, 5,712,043. and 6,576,181.

Laminar articles derived from a blend of polyolefin and nylon (polyamide) or nylon/polyvinyl alcohol blends have been used as fuel tanks for motor vehicles, providing a barrier minimizing the diffusion of hydrocarbons and oxygenated compounds in the fuel through the walls of the tank. U.S. Pat. No. 4,410,482 describes laminar articles of a polyolefin and a condensation polymer. EP0015556 describes laminar articles replacing nylon barrier with polyvinyl alcohol or ethylene/vinyl alcohol copolymers.

U.S. Pat. No. 4,950,513 describes a laminar article with improved barrier properties to oxygenated and hydrocarbon compounds blending about 60 to about 97 weight % polyolefin with a melt blend of about 2 to about 39 weight % nylon and a polyvinyl alcohol component, and using about 0.25 to about 12 weight % of an alkylcarboxyl-substituted polyolefin as a compatibilizer. The compatibilizer is prepared by grafting and has about 0.01 to about 20 weight % graft monomer.

U.S. Pat. No. 5,939,158 discloses a heterogeneous blend of (a) polyolefin with (b) a melt blend of a nylon and a polyvinyl alcohol component, and a compatibilizer (c), which is either i) a mixture of two different alkylcarboxyl-substituted polyolefins that serves as a compatibilizer; or ii) a small amount of alkylcarboxyl-substituted polyolefin with a small amount of grafted maleic anhydride moieties; or iii) a high weight percent of alkylcarboxyl-substituted polyolefin with a high graft level of grafted maleic anhydride moieties.

SUMMARY OF THE INVENTION

The invention provides a laminar shaped article comprising, consisting essentially of, or produced from a heterogeneous blend wherein the blend comprises, consists essentially of, or is produced from a halide polymer composition, a compatibilizer, and polyamide; the halide polymer composition includes a vinyl halide and/or vinylidene halide polymer and optionally an ethylene copolymer; and the compatibilizer is a functionalized polyolefin.

This invention further provides a process that can be used for preparing a laminar shaped article comprising combining a halide polymer composition, a polyamide incompatible with the halide polymer composition, and a compatibilizer to produce a mixture; heating the mixture to above the melting point of the highest melting resin in the mixture to produce a heterogeneous melt blend; stretching the melt blend up to five fold in at least one direction to produce a stretched body; and cooling the stretched body to below the melting point of the lowest melting resin in the mixture to produce an article wherein the halide polymer composition, the polyamide, and the compatibilizer are each as characterized above; the halide polymer composition may be present in the article in a continuous phase; the polyamide may be present in the article in the form of a discontinuous distribution of thin, substantially two-dimensional, parallel and overlapping layers.

The laminar article may be in the form of a substantially planar film or sheet. The laminar article may further comprise a substrate including cellular foams or woven or non-woven fabrics adhered to the heterogeneous blend. The substrate may serve as a reinforcing layer.

Alternatively, the shaped article has a hollow portion capable of containing a product.

DETAILED DESCRIPTION OF THE INVENTION

All publications, patent applications, patents, and other references mentioned herein are incorporated by reference in their entirety. Unless otherwise defined, all technical and scientific terms used herein have the same meaning as commonly understood by one of ordinary skill in the art to which this invention belongs. In case of conflict, the present specification, including definitions, controls.

Except where expressly noted, trademarks are shown in upper case.

Although methods and materials similar or equivalent to those described herein may be used in the practice or testing of the present invention, suitable methods and materials are described herein.

Unless stated otherwise, all percentages, parts, ratios, etc., are by weight. When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Use of "a" or "an" describes elements and components of the invention and includes one or at least one and the singular also includes the plural unless it is obvious that it is meant otherwise.

The materials, methods, and examples herein are illustrative only and, except as specifically stated, are not intended to be limiting.

The definitions for the terms "miscible", "miscibility" and "miscible blend" as used herein are to be construed as described in Olabisi Olagoki, Lloyd M. Robeson and Montgomery T. Shaw, *Polymer-Polymer Miscibility*, New York, Academic Press, 1979. As a general definition, a miscible blend of a two-component system forms a homogeneous system that is a single phase. That is, the first polymeric component has some degree of solubility in the second polymeric component. The term miscibility does not imply ideal molecular mixing but suggests that the level of molecular mixing is adequate to yield macroscopic properties expected of a single phase material. In contrast, an immiscible blend or heterogeneous blend of a two-component system remains a two-phase system, and the two-phase nature may be revealed using optical microcopy or electron microscopy.

The term "compatible" as used herein refers to blends of different polymers that may be well dispersed in each other without significant phase separation. As such, "compatible" does not imply that the polymers form miscible blends as defined above. "Incompatible resins" mean polymeric materials that have substantially no mutual miscibility in the melt form. Each of the resins may be a single polymer or a mixture of polymers.

The term "laminar" with reference to articles or compositions as used herein refers to the heterogeneous blend summarized above wherein the polyamide may be present as a multitude of thin, substantially two dimensional, parallel and overlapping layers embedded in a continuous phase of the halide polymer composition as a result of extending or stretching the heterogeneous blend.

(Meth)acrylic acid refers to acrylic acid, methacrylic acid, or both. (Meth)acrylate refers to acrylate, methacrylate, or both.

The halide polymer composition may comprise a vinyl halide polymer and/or vinylidene halide polymer and optionally an ethylene copolymer which comprises copolymerized units of ethylene and copolymerized units of a comonomer selected from the group consisting of $C_3$-$C_{12}$ ethylenically unsaturated monocarboxylic acids and salts thereof, $C_1$-$C_{18}$ alkyl esters of ethylenically unsaturated $C_3$-$C_{12}$ monocarboxylic acids, vinyl esters of $C_3$-$C_{18}$ saturated carboxylic acids, carbon monoxide and combinations of two or more thereof.

The functionalized polyolefin can be functionalized with a comonomer selected from the group consisting of maleic anhydride, maleic acid diesters, maleic acid monoesters, itaconic anhydride, itaconic acid diesters, itaconic acid monoesters, fumaric acid diesters, fumaric acid monoesters, or combinations of two or more thereof. The functionalized polyolefin can be as a compatibilizer.

In the laminar structure, the halide polymer may form a continuous phase, the polyamide may be present as a multitude of thin, substantially two dimensional, parallel and overlapping layers embedded in the continuous phase, and the third polymer may be present between the continuous phase and the layers thereby adhering the continuous phase and the layers together.

The membrane shows excellent barrier properties (hydrocarbon as well as gas) and may be flexible. Unlike other blends of halide polymer and polyamide, the laminar structure surprisingly requires much less barrier material to achieve comparable barrier properties. Less barrier material used in the halide polymer membrane provides lower material cost and a more flexible membrane, making it easier to install in the field. Although coextruded multilayer structures of halide polymer and polyamide may be used, they require more costly processing equipment to prepare. The laminar articles described herein are most suitable for people who only have monolayer extrusion equipment and want to make higher barrier halide polymer structures.

The halide polymer desirably has a lower melting range than the polyamide resin to facilitate formation of the laminar structure. A melt temperature difference of at least 5° C. is desirable, preferably at least 20 or 30° C.

PVC is the most widely available halide polymer. PVC may be a homopolymer of vinyl chloride or a copolymer thereof with a small amount, e.g., up to 20 weight %, of another copolymerizable monomer such as vinyl acetate or ethylene which does not change the essential character of the homopolymer. The PVC may have a glass transition temperature (Tg) of about 80° C. and may be melt processed by itself at a temperature of 180 to 200° C.

Polyvinylidene chloride (PVDC) resin may be a homopolymer consisting essentially of repeat units derived from vinylidene chloride or a copolymer comprising repeat units derived from 65 to 95 weight % of vinylidene chloride and optionally about 5 to about 35 weight % of at least one comonomer including vinyl chloride, acrylonitrile, an $\alpha,\beta$-unsaturated carboxylate ester, an $\alpha$-,$\beta$-ethylenically unsaturated carboxylic acid, or combinations of two or more thereof. Examples of PVDC resins include copolymers of vinylidene chloride and vinyl chloride, of vinylidene chloride and methyl acrylate, or combinations thereof. Suitable PVDC polymers and copolymers may be obtained commercially from Dow Chemical under the tradename SARAN, for example.

A halide polymer may withstand higher melt processing temperatures for limited periods of time which are nevertheless sufficient time to accomplish the formation of the laminar structure, without appreciable or detectable degradation of the halide polymer. PVDC has a higher melt processing temperature than PVC, but is somewhat less thermally stable.

The halide polymer composition optionally contains an additional ethylene copolymer compatible with, preferably miscible with, the halide polymer. The ethylene copolymer, when present, contains carboxyl and/or carbon monoxide moieties, wherein the carboxyl or carbon monoxide of the ethylene copolymer provides interaction with the polyamide, thereby helping to improve adhesion between the layers of the incompatible polyamide and the halide polymer. The carboxyl (COO—) and carbon monoxide moieties may covalently and hydrogen bond, respectively, with the polyamide. The ethylene copolymer may also promote melt processing by its presence in the melt, improving the ability of the polyamide to be dispersed within the halide polymer without any appreciable degradation of the halide polymer. It may also aid the mixing of the other polymer components by reducing the melt viscosity of the melt blend. Preferably, the additional ethylene copolymer contains both carboxyl and carbon monoxide groups.

The carboxyl-containing ethylene copolymer has attached thereto one or more carboxylic moieties, either on the polyolefin backbone itself or on side chains. The polymer may be a copolymer of ethylene and an ethylenically unsaturated carboxylic acid, ester, salt, ester, or combinations of two or more thereof. The carboxyl-containing ethylene copolymer may be made up of at least about 75 mole % of ethylene and from about 0.2 to about 25 mole % of the carboxylic component.

Examples of carboxyl-containing ethylene polymers are copolymers of ethylene with comonomers selected from the group consisting of $C_3$-$C_{12}$ $\alpha,\beta$-ethylenically unsaturated monocarboxylic acids, $C_1$-$C_{18}$ alkyl esters of $\alpha,\beta$-ethylenically unsaturated $C_3$-$C_{12}$ monocarboxylic acids, vinyl esters of $C_2$-$C_{18}$ saturated carboxylic acids and combinations thereof. Specific examples include ethylene/vinyl acetate copolymers, ethylene/alkyl acrylate copolymers, ethylene/alkyl methacrylate copolymers, ethylene/acrylic acid dipolymers, ethylene/methacrylic acid dipolymers, ethylene/alkyl acrylate/acrylic acid terpolymers, and ethylene/alkyl methacrylate/methacrylic acid terpolymers wherein the alkyl group contains 1 to 8, or 1 to 4, carbon atoms. Such ethylene copolymers include copolymers of ethylene with methyl acrylate, propyl acrylate, n-butyl acrylate, hexyl acrylate, and/or acrylic acid and methacrylic acid. For these polymers, the amount of ethylene may be about 30 to 60 weight %, with the carboxyl functionality being about 40 to 70 weight %, to total 100 weight % of the copolymer.

Ethylene vinyl acetate (EVA) copolymers include EVA dipolymers, EVA terpolymers and higher order copolymers. "EVA dipolymers" describes copolymers consisting essentially of only copolymerized units of ethylene and vinyl acetate. "EVA terpolymers" describes copolymers prepared by copolymerization of ethylene, vinyl acetate and an additional comonomer such as carbon monoxide. Copolymerized vinyl acetate units may be from about 5 to about 35 weight %, or about 8 to about 20 weight %, of the EVA copolymer. EVA copolymers include those available from E. I. du Pont de Nemours and Company (DuPont), Wilmington, Del. as ELVAX.

Ethylene alkyl acrylate copolymers or ethylene alkyl methacrylate copolymers comprise copolymerized units of ethylene and alkyl acrylate or alkyl methacrylate, respectively. Preferably, the alkyl group contains one to six carbon atoms, more preferably one to four carbon atoms. Methyl acrylate, ethyl acrylate, isobutyl acrylate and n-butyl acrylate are preferred comonomers. The amount of copolymerized units of alkyl acrylate or alkyl methacrylate comonomer present in these copolymers may vary broadly from a few weight % to as high as 40 weight % of the copolymer or even higher, such as about 5 to about 35 weight %, or about 8 to about 20 weight %, of the ethylene alkyl(meth)acrylate copolymer. Ethylene alkyl acrylate copolymers include those available from DuPont as ELVALOY AC.

Ethylene acid copolymers may be described as E/X/Y copolymers where E represents copolymerized units of ethylene, X represents copolymerized units of a $C_{3\text{-}8}$ $\alpha,\beta$-ethylenically unsaturated carboxylic acid, and Y represents copolymerized units of a softening comonomer selected from alkyl acrylate and alkyl methacrylate, wherein the alkyl groups have from 1 to 8 carbon atoms, and vinyl acetate. "Softening" means that the polymer is made less crystalline.

X may be present in 2 to 30 (or 5 to 25, or 8 to 20) weight % of the polymer, and Y may be present in from 0 to 45 weight % of the polymer. Of note are copolymers wherein Y is 0% of the copolymer (that is, an E/X dipolymer), including without limitation, ethylene/acrylic acid and ethylene/methacrylic acid dipolymers. Also of note are E/X/Y terpolymers wherein X is present in 2 to 20 (or 5 to 25, or 8 to 20) weight % of the polymer, and Y is present in about 1 to about 45 (such as from a lower limit of 1, 3, or preferably 10, to an upper limit of 25, 30 or 45) weight % of the polymer.

Methods of preparing ethylene acid copolymers are well known such as described in U.S. Pat. No. 5,028,674. Copolymers of ethylene and an unsaturated carboxylic acid, such as acrylic acid or methacrylic acid (ethylene acid copolymers) are available from DuPont under the NUCREL tradename.

Ionomeric resins (ionomers) are ethylene acid copolymers as described above that have some portion of the acidic groups in the copolymer neutralized with base to form salts comprising alkali metal ions alkaline earth ions or transition metal ions such as sodium or zinc. They may be prepared from the acid copolymers by methods well known to one skilled in the art such as that described in U.S. Pat. No. 3,264,272. Ionomers are available from DuPont under the SURLYN tradename.

The ethylene copolymer may contain carbon monoxide which enables a small amount of acetate, (meth)acrylate, or acrylic acid comonomer to be used, allowing hydrogen bonding with the polyamide. For these copolymers the ethylene may be about 50 to 70 weight %, the acid, (meth)acrylate, or acetate may be about 24 to 40 weight %, and carbon monoxide may be about 5 to 15 weight %, to total 100 weight % of the ethylene copolymer. Preferred are ethylene/vinyl acetate/carbon monoxide copolymers (EVACO). Ethylene/alkyl acrylate/carbon monoxide copolymer or ethylene/alkyl methacrylate/carbon monoxide copolymer wherein the alkyl group contains 1 to 8, preferably 1 to 4, carbon atoms are also preferred, including ethylene/n-butyl acrylate/carbon monoxide copolymer (EBACO). These copolymers are available from DuPont under the ELVALOY tradename.

The halide polymer composition may optionally include about 5 to about 40 weight %, or about 20 to about 40 weight % of the ethylene copolymer.

The heterogeneous blend also comprises a compatibilizer. The amount of the compatibilizer incorporated in the composition may be any amount effective to compatibilize the halide polymer and the polyamide, one with the other, to provide a laminar structure that does not delaminate.

The compatibilizing effect is manifested by intimate, essentially void-free contact between the halide polymer and polyamide phases of the melt and thus of articles fabricated therefrom, and by a toughness which is greater than either of the halide or polyamide components individually.

The compatibilizer is preferably highly compatible or miscible with the halide polymer in the melt blending process, whereby under magnification, the composition (upon cooling) has only two phases that are visible, the halide polymer phase and the polyamide phase. The miscibility of the compatibilizer with the halide polymer tends to promote the halide polymer as the matrix phase or continuous phase.

The compatibilizer may be a polyolefin functionalized with a comonomer selected from the group consisting of maleic anhydride, maleic acid diesters, maleic acid monoesters, itaconic anhydride, itaconic acid diesters, itaconic acid monoesters, fumaric acid diesters, fumaric acid monoesters, and combinations thereof.

The copolymers used as compatibilizers may be produced by direct copolymerization or by grafting. In "direct" or random copolymers, the copolymerized monomers are part of the polymer backbone or chain. In contrast, in graft copolymers, the comonomer is attached to non-terminal repeat units in an existing polymer chain, often by a subsequent free radical reaction.

Suitable compatibilizers comprise ethylene directly copolymerized with a functional comonomer selected from the group consisting of maleic anhydride, maleic acid diesters, maleic acid monoesters; itaconic anhydride, itaconic acid diesters, itaconic acid monoesters, fumaric acid diesters; fumaric acid monoesters; or mixtures of any of these, including esters of $C_1$ to $C_4$ alcohols, such as, for example, methyl, ethyl, n-propyl, isopropyl, and n-butyl alcohols. The functional comonomer is preferably maleic anhydride, or monoesters and/or diesters of maleic acid, more preferably maleic anhydride or monoesters of maleic acid, such as ethyl hydrogen maleate. The amount of the comonomer may be from about 3 to about 15 weight % of the copolymer. The copolymers may also comprise a third comonomer selected from the group consisting of vinyl acetate, acrylic acid, methacrylic acid, alkyl acrylate and methyl acrylate. These compatibilizing copolymers may be obtained directly from the monomers by a high-pressure free radical polymerization process, described, for example, in U.S. Pat. No. 4,351,931.

An example of grafting is the addition of an α-olefin containing a carboxylic acid or derivative to a polyolefin backbone. In grafting, a polyolefin may be reacted with an unsaturated carboxylic acid, anhydride, ester, or combinations of two or more thereof including, diethyl maleate, ethyl hydrogen maleate, di-n-butyl maleate, maleic anhydride, maleic acid, fumaric acid, itaconic acid, one or more monoesters of the acids; dodecenyl succinic anhydride, 5 norbornene-2,3-anhydride, nadic anhydride, or combinations of two or more thereof. The polyolefin may be the same as one disclosed above as an additional copolymer. Grafting is well known as disclosed in, e.g., U.S. Pat. Nos. 4,026,967 and 3,953,655.

The compatibilizer may be a polymer composition that includes a reactive functionality such as anhydride functionality. That is, it contains carboxylic acid anhydride groups. The anhydride provides better bonding to the polyamide phase, believed to result from chemical reaction between the anhydride groups with the polyamide.

Anhydride modification may be obtained by a grafting reaction between a preformed copolymer with maleic acid or maleic anhydride to form pendant succinic anhydride groups on the copolymer by conventional procedures (a maleated copolymer). For example, the amount of anhydride modification may be about 0.1 to about 3 weight % based on the weight of the copolymer. Of note are graft copolymers of maleic anhydride with a polyethylene such as LLDPE (linear low density polyethylene), graft copolymers of maleic anhydride with ethylene copolymers, or graft copolymers of maleic anhydride with polypropylene. Maleic anhydride-grafted polymers also include maleated styrene-ethylene-butene-styrene triblock copolymer and maleated polybutadiene. Graft copolymers are available from DuPont under the BYNEL or FUSABOND tradenames.

A preferred ethylene polymer is ethylene/alkyl acrylate/CO terpolymer modified with succinic anhydride (or grafted with maleic anhydride), wherein the alkyl group has 1 to 8 or 1 to 4 carbon atoms, and the alkyl acrylate is preferably n-butyl acrylate.

The polyamide may be selected for its ability to act as a barrier to moisture, hydrocarbons or combinations thereof. A single polymer or a combination of polymers may be used. Polyamide may be any amorphous or crystalline polyamide, such as described in U.S. Pat. No. 5,770,654. Polyamides are well known and may be made under well-known conditions. Polyamides from single reactants such as lactams or amino acids, referred to as AB type polyamides are disclosed in *Nylon Plastics* (edited by Melvin L. Kohan, 1973, John Wiley and Sons, Inc.) and may include nylon 6, nylon 11, nylon 12, or combinations of two or more thereof. Polyamides prepared from more than one lactam or amino acid include nylon 6,12.

Polyamides may also be made by reacting carboxylic acids (or derivatives) with primary amines. Examples of carboxylic acids used in polyamide preparation are adipic acid, suberic acid, sebacic acid, azelaic acid, malonic acid, glutaric acid, pimelic acid, and the like. Examples of primary amines are tetramethylene diamine, pentamethylene diamine, hexamethylene diamine, octamethylene diamine, and the like. Exemplary polyamides include polypentamethylene adipamide, polyhexamethylene adipamide, polyhexamethylene sebacamide, polyamides obtained from lactams such as caprolactams and from amino acids such as 11-amino-undecanoic acid, and the like. Polyhexamethylene adipamide and polycaproamide are preferred.

Frequently used polyamides include nylon 6, nylon 11, nylon 12, nylon 6,12, nylon 10,10, nylon 6,10/6T and nylon 6,12/6T, or combinations of two or more thereof, especially nylon 11, nylon 12, nylon 10,10, nylon 6,10/6T and nylon 6,12/6T, or combinations of two or more thereof.

Preferably, the polyamide is melt processable below a temperature of about 270° C. and has a number average molecular weight of at least 5000. The polyamide more preferably is melt processable at a temperature of less than about 220° C. Some polyamides are melt processable at temperatures less than about 200° C. The melt processing temperature of the polyamide is the temperature at which the viscosity of the polyamide is low enough that it may be deformed and compacted into a unitary, essentially void-free mass. This is not a specific melt viscosity but it is a melt viscosity range at which these results may be obtained, which enables the melt processing of the composition to be carried out. In the case of crystalline polyamide, this viscosity is reached by the melt processing temperature exceeding the melting point (determined by Differential Scanning Calorimetry (DSC) of the polyamide). In the case of amorphous polyamide, which may also contain a crystalline polyamide phase, this viscosity is reached at temperature above the Tg of the polyamide at which the polyamide softens sufficiently to provide the viscosity desired for melt blending. The relatively low melt processing temperature of the polyamides used allows for the possibility of the halide polymer and polyamide to be melt processed without degradation of the halide polymer. Polyhexamethylene diamine (nylon 6,6) melting at 255° C., may be less preferred because of its high melting point. Examples of polyamides having sufficiently low melt processing temperatures include polydodecamethylene dodecanoamide (nylon 12,12) with a melting point of 184° C., polycaprolactam (nylon 6) with a melting point of about 215° C. and the amorphous polyamides prepared by copolymerizing (condensation polymerizing) a mixture of diacids, such as adipic and isophthalic acids with hexamethylene diamine. Nylon 6,12 (polyhexamethylene dodecanoamide) has a Tg of about 46° C., and melting points ranging from about 142 to about 224° C., such as about 211° C. Nylon 6,12/6T has a melting point of about 185° C., nylon 11 has a melting point of about 189° C., and nylon 12 has a melting point of about 178° C.

Polyamides include those available from DuPont as PIPELON.

The halide polymer composition may be present in the heterogeneous blend in the range from any lower limit of about 40 to 55, 60 or 70 to any upper limit of about 90 or 95 weight %. The polyamide resin may be present in the heterogeneous blend in the range of from any lower limit of about 5 or 10 to any upper limit of about 30, 40 or 45 weight % such as about 5 weight % to about 25 weight % or 5 weight % to about 15 weight % of the blend. The compatibilizer may be present in the blend from any lower limit of about 1, 3, 4, 5, 6 or 10 weight % to any upper limit of about 10, 20 or 40 weight % such as about 4 to about 20 weight % or 6 to 10 weight %. All are based on the weight of the blend.

The halide polymer composition may include components other than the halide polymer. For example, the halide polymer composition may comprise from 0.0001 to about 20 or 25 weight % of one or more additives described below, based on the combination of halide polymer and additive(s).

An example halide polymer composition includes a mixture of about 40 to about 70, or 45 to 65, weight % of PVC, 20 to 60, or 30 to 60, or 35 to 55, or 20 to 40, weight % of ethylene copolymer such as ethylene/alkyl acrylate copolymer or ethylene/alkyl acrylate/CO terpolymer or ethylene/vinyl acetate/CO terpolymer, and up to about 20 weight % of one or more additives described below, based on the combination of halide polymer, additional polymer and additive(s). For example, ethylene and PVC can be about 50/50 in a halide polymer composition, not counting additives. These mixtures may be prepared as dry blends of the individual components prior to processing with the polyamide and compatibilizer.

Each of the individual components or the blend may include about 0.001% to about 10 or 20 weight % of one or more additives known in the art including one or more plasticizers such as diisodecyl phthalate, processing aids, release aids, flow enhancing additives, oils such as epoxidized soybean oil, lubricants, pigments, dyes, flame retardants, impact modifiers, nucleating agents to increase crystallinity, antiblocking agents such as silica, thermal stabilizers, ultraviolet (UV) absorbers, UV stabilizers such as TINUVIN 622, antioxidants such as IRGANOX 1076, $TiO_2$, fillers such as calcium carbonate, dispersants, surfactants, chelating agents, biocides, adhesives, primers, antistatic agents, slip agents and the like. The stabilizers may protect the membrane materials from aging and the product contained therein from degradation by, for example, harmful UV light.

The laminar articles may be prepared substantially by the process described in U.S. Pat. No. 4,410,482. The laminar articles may be made by mixing together particles of the halide polymer dry blend, particles of the polyamide and particles of the compatibilizer, heating the mixture to yield a heterogeneous melt of material and forming the melt in a way that results in extending the melt to yield multiple elongated discontinuous polymer domains of the polyamide within a continuous domain of the halide polymer. The term "extending the melt" means that a given volume of melt is shaped by means which significantly increase its surface area, such as the extension which would occur when the melt is squeezed by rollers, pressed between platens, extended between die lips or inflated during blow molding or blown film extrusion.

The polymer particles (or other forms) of components in un-melted form may be mixed thoroughly so as to provide a statistically homogenous distribution of particles. The dry mix may be then fed to a single-screw extruder, for example, whereupon heating, the halide polymer dry blend and compatibilizer melt first. The melt temperature of the blend is below the melting point of the polyamide barrier resin. As such, the particles of polyamide may soften and elongate to form platelets or layers. Care is desirably exercised to avoid substantial additional mixing once the platelets or layers are formed. The blend may also be established by combining molten halide polymer with solid particles of polyamide and compatibilizer and then heating the combination. Success depends on establishing a melted heterogeneous blend of polymers which, when extended; e.g., by extrusion, yields an article in which the halide polymer (e.g., PVC) is in the form of a continuous matrix phase and the polyamide is in the form of a discontinuous distributed phase. The polyamide comprising the discontinuous phase is present as a multitude of thin parallel and overlapping layers embedded in the continuous phase.

It is preferred that both the halide polymer dry blend, the compatibilizer and the polyamide are mixed as particles. The particles may be of a size such that the molten blend of incompatible polymers, when introduced to some melt extension means (e.g., extrusion die lips), exhibit the heterogeneity necessary for forming the multitude of thin parallel and overlapping layers. When the particles, such as those of the polyamide, are of too small in size, the melted blend, even though not excessively mixed, may tend to function as a homogeneous composition because the domains of material making up the discontinuous polyamide phase are so small. When the particles, such as those of the polyamide, are of too large in size, the melt blend may tend to form into shaped articles having a marbleized structure rather than a laminar structure. In such cases, the large domains of the materials that make up the discontinuous phase extend to opposite boundaries of the shaped articles and cause disruption of the halide polymer that makes up the continuous phase. Particles about 1 to 7 mm or about 2 to 4 mm on a side can be well suited. The particles are preferably generally regular in shape, such as cubical or cylindrical or the like. The particles may, however, be irregular; and they may have one or two dimensions substantially greater than other dimension such as would be the case, for example, when flakes of material are used. It may be easier to handle pellet-form halide polymer dry blend during the converting process. It may be desirable to convert the halide polymer dry blend by melt-compounding into cubical or cylindrical shape prior to mixing it with the polyamide and the compatibilizer. When the halide polymer, such as PVC is from recycle, it may be in the form of chips, having the thickness of containers from which the polymer was derived and measuring about 6 to 9 mm resulting from comminuting of the containers. The polyamide and compatibilizer may be in the form of granules or pellets.

When each of the incompatible polymers is present as individual particles, the particles may be preferably of approximately the same size, although this is not required. The compatibilizer may be provided by itself as individual particles, or it may be mixed into, coated onto, or otherwise combined with the halide polymer or the polyamide. Preferably, the compatibilizer is not melt blended directly with the polyamide prior to making the laminar articles, because the compatibilizer may cause gellation or crosslinking of the polyamide when so blended. In order to ensure that the compatibilizer is well distributed in the final blend, it is sometimes desirable to supply the compatibilizer in a powdered, rather than a pelletized form.

The thickness of the layers of material in the discontinuous phase may be a function of the particle size combined with the degree of extension in the forming step. The particle size of the melt blend which may be the discontinuous phase may be selected with a view toward obtaining, after extension, overlapping layers which may be from about 0.01 to about 60 μm thick or perhaps slightly thicker. The particle size of the polyamide in the discontinuous phase may be from any lower limit of about 0.01, 0.1 or 0.5 to any upper limit of about 50, 100 or 200 μm.

Dry mixing particles of the polymers may be accomplished by any well-known means such as by means of a V-blender or a tumble mixer or, on a larger scale, by means of a double-cone blender. Continuous mixing of the particles may be accomplished by any of several well-known methods, including gravimetric feeders. The particles may also be mixed by hand so long as any two statistical samplings of the mixture in a given mass of material yield substantially the same composition. The mixing of the incompatible polymers may also be accomplished by adding particles of the higher melting polyamide to a melt of the lower melting halide polymer maintained at a temperature below the higher melting point. In that case, the melt is agitated to obtain an adequate mixture; and the mixture is then ready for the final heating step.

Once mixed, the incompatible polymers are ultimately heated to a temperature greater than the melting range of the higher melting polyamide. The heating yields a molten heterogeneous blend of materials which is ready for the stretching step of the process. The heating is conducted in a manner which avoids substantial additional mixing of the incompatible polymers because such mixing could cause homogenization and could result in a melt and a shaped article of substantially uniform, unlayered structure. The heating may be conducted by any of several well-known means and is usually conducted in an extruder. A single-screw extruder of the type designed for material transport rather than material mixing may be used for the heating step and for transporting material to the forming steps of this process without causing homogenization of the molten two-phase polymer composition. Low shear and low mixing extruders of the kind normally used for polyvinyl chloride or polyvinylidene chloride may be used to prepare the articles if they are used in a way to melt and transport the materials while minimizing mixing of the components. High shear and high mixing extruders of the kind normally used for polyamide and polyethylene are generally not used.

The forming step involves extension of the molten blend followed by cooling. Melt extension may be accomplished by any of several means. For example, the melt may be extended by being squeezed between rollers, pressed between platens or extruded between die lips, or varying take off (roller) speed. Molding processes such as blow molding also cause extension in accordance with this process. In the manufacture of shaped articles such as containers, the extension may be accomplished by a combination of extruding a blend of the heterogeneous melt to yield a container preform or parison followed by blow molding the parison into a finished container.

Shaped articles of the laminar composition may also be prepared by thermoforming processes. Thermoformed articles may have a shape in which a sheet of material shape forms a concave surface such as a tray, cup, can, bucket, tub, box or bowl. A flat sheet of a heterogeneous blend of the halide polymer, polyamide and compatibilizer is heated, for example by a black-body radiator from above and below the sheet, during which time the surface temperature of the sheet may rise toward its forming temperature. At the end of the heat-cycle the sheet is immediately positioned over an unheated, optionally cooled cavity mold and clamped to the mold perimeter. Vacuum from within the mold during a short period draws the sheet into the mold. After a cooling period the thermoformed article is ejected from the mold. Alternatively, a plug may force the softened sheet into the cavity mold. Either method provides an article in which the sheet is stretched or drawn into a shape having a thinner cross-section and a greater surface area than the sheet had originally. The stretching provides the laminar composition.

Profiles have a particular shape are fabricated by melt extrusion processes that begin by extruding a thermoplastic melt through an orifice of a die forming an extrudate capable of maintaining a desired shape. The melt may be a monolayer or multilayer flow in which at least one layer comprises a heterogeneous blend of the halide polymer, polyamide and compatibilizer. The extrudate is drawn into its final dimensions while maintaining the desired shape and then quenched in air or a water bath to set the shape, thereby producing a profile. The drawing operation provides the extension of the melt to provide the laminar composition. A common shape of a profile is tubing or wire and cable wrap.

The extension or melt forming may be in a single direction or in perpendicular directions. Whether the forming is conducted in one direction or two, there should be an elongation of from about 10 to 500 or even 1000% or more in at least one direction; an elongation of about 100 to about 300% is preferred. Avoidance of excessive extension is important only insofar as excessive elongation of the melt may lead to weakening or rupture of the article.

Melt extension or forming is followed by cooling to below the melting temperature of the halide polymer to solidify the shaped article. The cooling may be conducted by any desired means and at any convenient rate. In the case of extension by blow molding, the mold is often chilled to cool the article; and, in the case of extruding a film, cooling may be accomplished by exposure to cool air or by contact with a quenching roll.

In the actual step in which extension of the melt occurs so as to form the laminar articles, the temperature of the melt is preferably about 5 to 10° C. greater than the melting point of the higher melting polyamide. Higher temperatures tend to lower the melt viscosities of the incompatible polymers that in turn may facilitate homogenization, which is to be avoided.

Laminar articles prepared by extension of the molten heterogeneous polymer blends described herein generally have better properties if the melt viscosity of the polyamide is somewhat greater than the melt viscosity of the halide polymer, both viscosities being measured at about the temperature at which forming occurs. The melt viscosity of the polyamide may be from 1.1 to 3.5 times greater than the melt viscosity of the halide polymer.

Films, sheets and coated articles comprising the laminar blend compositions may be made by virtually any method for thermoplastic forming known to those skilled in this art. As such, the film and film structures may be typically cast, extruded, coated, and the like, including orientation or stretching (either uniaxially or biaxially) by various methodologies (e.g., blown film, mechanical stretching or the like).

Multilayer structures may be prepared by coextrusion of the heterogeneous blend that provides the laminar composition and additional resins. An additional resin may also be applied to a sheet or film of the laminar composition by extrusion coating.

The laminar composition may be adhered to a substrate including cellular foams, woven or non-woven fabrics, or fiberglass. Fabrics include nonwoven polypropylene, nonwoven polyethylene, nonwoven polyethylene terephthalate, woven polyethylene terephthalate, woven polypropylene, woven polyethylene, spunbond polypropylene, or spunbond polyester. The fabric substrate may provide reinforcement to the laminar composition. The laminar composition may be adhered directly to the substrate.

Additional layers of thermoplastic materials may also be included to provide a multilayer structure comprising the laminar composition. For example, the laminar composition may be adhered to the substrate using an intervening adhesive layer using an extrusion lamination process, in which an adhesive composition is applied between the laminar composition and the substrate as a curtain of molten polymer. A lamination apparatus may comprise a pair of master rolls respectively containing a rolled sheet of the substrate and a rolled sheet of the laminar composition. The laminar composition sheet is passed over a guide roller and then into a lamination nip sequence formed between a nip roller and a chill roller, while the adhesive composition is being extruded in a liquid state from an extruder between the laminar composition sheet and substrate. As the substrate, the molten adhesive composition, and the laminar composition sheet pass between the nip roller and the chill roller, they are laminated together.

The barrier properties of the laminar articles are useful in preventing volatile components from permeating through a membrane prepared therefrom. For example, the membrane may provide excellent permeation resistance against a variety of organic liquids, such as aliphatic hydrocarbons, for example, gasoline, heptane and the like; aromatic hydrocarbons, for example toluene, xylene and the like; halogenated hydrocarbons, for example trichloroethane, o-dichlorobenzene and the like; paint thinner; solvents such as acetone, ethanol and the like; and vapors of these organic liquids.

Barrier flexible PVC membrane in film or sheet form may be used in roofing membranes, pond liners, water reservoir liners or any other types of geomembranes where high hydrocarbon barrier properties are required.

A roofing membrane may include the laminar composition as a top layer, a fabric substrate as an inner reinforcing layer and a bottom layer comprising another thermoplastic composition. As used herein, "top layer" refers to the layer of a roofing membrane that is applied farthest from the roof decking and "bottom layer" refers to the layer of the membrane that is applied closest to the roof decking.

The roofing membranes described above are flexible and may be formed into rolls which may be simply unrolled over a roof support structure to allow for easy installation.

Articles that may be made from the laminar composition also include vials, caps, syringes, containers, fuel tanks, trays, tubing, filaments, pipes, or combinations of two or more thereof.

Some containers and trays may be prepared by thermoforming sheets of the laminar composition. Thermoformed articles as described above are often used as containers for packaging various consumer goods. Other articles, such as toys, panels, furniture and automotive parts may also be prepared similarly.

Vials, containers and syringes may be prepared by, for example, blow molding. Vials and containers may be of any size, for example but not limitation, with fill volumes ranging from 0.1 ml to 1000 ml or larger. Syringes and caps may be prepared by injection molding. Tubing may be prepared by profile extrusion as described above. Tubing assemblies for the packaging and transport of liquids and vapors are well known and the tubing may be in nearly constant contact with fluids and additives. Tubing may be used in packaging, storage and transfer of consumable fluids, for example beverages, and in medical applications, for example in packaging, storage and transfer of solutions for intravenous treatment.

These articles may be monolayer, comprising only the laminar composition, or multilayer, comprising at least one additional layer of another thermoplastic resin.

The properties of the laminar shaped articles, such as their barrier properties, may be modified by post-shaping annealing, for example, heating the article to a temperature below the lowest melt temperature, such as from about 60 to about 120° C. for about 1 to 36 hours.

EXAMPLES

Materials Used

PVC-1: a flexible (plasticized) PVC dry blend powder available from Pliant (Shaumberg, Ill.) under the tradename CBIX.

PVC-2: PVC with inherent viscosity of 1.02, available as VISTA 5415 from Condea Vista Company.

EBACO-1: An ethylene/n-butyl acrylate/carbon monoxide copolymer with melting point of 62° C. and MI of 12 g/10 min., available from DuPont as ELVALOY HP 661.

EVACO-1: An ethylene/vinyl acetate/carbon monoxide copolymer with melting point of 66° C., available from DuPont as ELVALOY 741.

N-6,12/6T: a polyamide copolymer (nylon 6,12/6T), with a melting point of about 185° C., from DuPont under the tradename PIPELON 310054.

Comp-1: an ethylene/butyl acrylate/CO copolymer graft-modified with about 1 weight % of maleic anhydride available from DuPont under the tradename FUSABOND 423D, used as the compatibilizer.

DIDP: diisodecyl phthalate

Stab-1: Ba/Zn stabilizer available as Mark 4737 from Witco Company.

Oil-1: epoxidized soybean oil available as DRAPEX 6.8 from Witco Company.

$TiO_2$: available commercially as TI-PURE R-960 from DuPont.

CaCO3: filler available commercially as ATOMITE whiting.

RA-1: stearic acid release aid

AO-1: antioxidant available as IRGANOX 1076 from Ciba-Geigy.

UVS-1: UV stabilizer available as TINUVIN 622 from Ciba-Geigy.

BIO-1: biocide available as VINYZENE SB1-ELV from Morton International.

Dry blend pellet compositions were prepared from the materials listed above using the following general procedure to provide pellets summarized in Table 1. The compositions were fed into a 30-mm Buss kneader equipped with a Buss number 1 screw, using these settings.

| Zones 1 and 2 | Zones 3 and 4 | Crosshead | Die | Crosshead rpm | Kneader rpm |
|---|---|---|---|---|---|
| 165° C. | 175° C. | 175° C. | 175° C. | 30 | 300 |

The blended composition was extruded through a 0.5-cm die. The die strand was quenched in water and cut into pellets using an air cutter. The pellets were dried at room temperature.

TABLE 1

| | Weight % | | | |
|---|---|---|---|---|
| Dry Blend | CBIX | Comp-1 | EBACO-1 | N-6, 12/6T |
| DB-1 | 100 | | 0 | 0 |
| DB-2 | 90 | 2 | 0 | 8 |
| DB-3 | 65 | | 35 | 0 |
| DB-4 | 59 | 2 | 31 | 8 |
| DB-5 | 44 | 3 | 23 | 30 |

Sheet Sample Preparation

Cast sheets, 30 mils thick, were prepared on a 1.5-inch Davis sheet extrusion line using a general-purpose screw without mixing device using the compositions listed in Table 2. Processing temperatures were set at the lowest possible temperature allowing extrusion and production of sheet. All the blend components were dry blended to prepare a pellet blend prior to be introduced to the extruder hopper.

The 30-mil sheet samples were prepared using a 9-inch flat sheet die (from Davis Standard). Sheet samples were produced using 193° C. melt temperature for the PVC-1 dry blend DB-1 and 187° C. for the heterogeneous blend of Example 1. Screw speeds of 65 rpm were used in producing both samples.

Cup Test

Stainless steel cups were filled with xylene. The sheet samples were cut into 3-inch diameter circles and mounted on the metal cups by clamping the sheet to the cup using a metal ring. The cup samples were weighed prior to be placed into a 50° C. oven. Cup samples were weighed periodically over the next two weeks. The percentage of weight loss was calculated by subtracting the initial weight from the final weight and dividing the initial weight. The results are summarized in Table 2.

TABLE 2

| | Weight % of components | | | |
|---|---|---|---|---|
| Example | PVC-1 (DB-1) | Comp-1 | N-6, 12/6T | % Weight Loss |
| C1 | 100% | 0 | 0 | 18.6 |
| 1 | 90% | 2% | 8% | 5.5 |

Dry blends are prepared from the materials listed in Table 3 using the procedure described above to make pellets.

TABLE 3

| Ingredient | DB-6 | DB-7 | DB-8 | DB-9 | DB-10 | DB-11 |
|---|---|---|---|---|---|---|
| PVC-2 | 100 | 100 | 100 | 100 | 100 | 100 |
| EBACO-1 | 60 | 60 | 60 | 0 | 0 | 0 |
| EVACO-1 | 0 | 0 | 0 | 60 | 60 | 60 |
| DIDP | 15 | 15 | 15 | 15 | 15 | 15 |
| Stab-1 | 3 | 3 | 3 | 3 | 3 | 3 |
| Oil-1 | 5 | 5 | 5 | 5 | 5 | 5 |
| RA-1 | 0.3 | 0.3 | 0.3 | 0.3 | 0.3 | 0.3 |
| AO-1 | 0.2 | 0.2 | 0.2 | 0.2 | 0.2 | 0.2 |
| UVS-1 | 0.5 | 0.5 | 0.5 | 0.5 | 0.5 | 0.5 |
| Bio-1 | 1.5 | 1.5 | 1.5 | 1.5 | 1.5 | 1.5 |
| $CaCO_3$ | 0 | 10 | 0 | 0 | 10 | 0 |
| $TiO_2$ | 0 | 0 | 20 | 0 | 0 | 20 |
| Total | 185.5 | 195.5 | 205.5 | 185.5 | 195.5 | 205.5 |

Pellets of DB-7 are processed through an extruder and extrusion coated onto polyester fabric (10×10 weave) to prepare a substrate. Pellets of DB-8 (205.5 parts by weight) are mixed with 20 parts by weight of N-6,12/6T pellets and 4 parts by weight of Comp-1 pellets using gravimetric feeders. The heterogeneous blend is extrusion coated, using the method described in "Sheet Sample Preparation", onto substrate on the side of the polyester fabric opposite the first extrusion coated composition to prepare a multilayer laminar article of the invention. Another multilayer laminar article is prepared similarly by replacing DB-7 with DB-10 and DB-8 with DB-11. A third multilayer laminated article is prepared by preparing a laminar composition of DB-8 (205.5 parts by weight), 20 parts by weight of N-6,12/6T and 4 parts by weight of Comp-1 as described above and extrusion coating both sides of the polyester fabric with the laminar composition. The multilayer articles are suitable as roofing membranes.

The invention claimed is:

1. An article comprising a heterogeneous blend wherein the article is a laminar shaped article;
the blend comprises a halide polymer composition, a polyamide, and a compatibilizer;
the halide polymer composition comprises a vinyl halide polymer, a vinylidene halide polymer, or both and optionally an ethylene copolymer;
the polyamide is present as a multitude of thin, substantially two dimensional, parallel, and overlapping layers embedded in a continuous phase of the halide polymer composition; and
the compatibilizer is a functionalized polyolefin.

2. The article of claim 1 wherein the halide polymer comprises chlorine as the halogen moiety and the functionalized polyolefin is functionalized with a comonomer including maleic anhydride, maleic acid diesters, maleic acid monoesters, itaconic anhydride, itaconic acid diesters, itaconic acid monoesters, fumaric acid diesters, fumaric acid monoesters, or combinations thereof.

3. The article of claim 2 wherein the article is a flexible article and the halide polymer is polyvinylchloride homopolymer, polyvinylchloride copolymer, polyvinylchloride homopolymer, or polyvinylchloride copolymer; a flexible is an article that comprises plasticizer.

4. The article of claim 3 wherein the halide polymer composition is present in the blend from about 55 to about 95%; the compatibilizer is present in the in the blend in about 1 to about 10%; and the polyamide is present in the blend from about 5 to about 45%; based on the weight of the blend.

5. The article of claim 4 wherein the polyamide component is present in the blend about 5 weight % to about 25 weight %; the compatibilizer is present in the blend in about 3 to about 10 weight %; and the compatibilizer is a graft copolymer of maleic anhydride with polyethylene, graft copolymer of maleic anhydride with an ethylene copolymer, graft copolymer of maleic anhydride with polypropylene, maleated styrene-ethylene-butene-styrene triblock copolymer or maleated polybutadiene.

6. The article of claim 4 wherein the compatibilizer is a graft copolymer of maleic anhydride with ethylene/alkyl acrylate/CO copolymer.

7. The article of claim 4 wherein the compatibilizer is ethylene copolymerized with a comonomer selected from the group consisting of maleic anhydride, maleic acid monoesters, maleic acid diesters, and combinations thereof.

8. The article of claim 4 wherein the halide polymer composition comprises the ethylene copolymer, which is present in about 20 to about 40 weight % of the halide polymer composition.

9. The article of claim 4 wherein
the halide polymer comprises a dry blend of about 40 to about 70 weight % of polyvinyl chloride, about 20 to about 60 weight % of the ethylene copolymer, and up to about 20 weight % of one or more additives;
the ethylene copolymer is a copolymer comprising copolymerized units of ethylene and copolymerized units of a comonomer selected from the group consisting of $C_3$-$C_{12}$ ethylenically unsaturated monocarboxylic acids and salts thereof, $C_1$-$C_{18}$ alkyl esters of ethylenically unsaturated $C_3$-$C_{12}$ monocarboxylic acids, vinyl esters of $C_3C_{18}$ saturated carboxylic acids, carbon monoxide and combinations thereof; and
the additive is plasticizer, processing aid, release aid, flow enhancing additive, oil, lubricant, pigment, dye, flame retardant, impact modifier, nucleating agent, antiblocking agent, UV absorber, UV stabilizer, antioxidant, $TiO_2$, filler, dispersant, surfactant, chelating agent, biocide, adhesive, primer, antistatic agent, or slip agent.

10. The article of claim 9 wherein the ethylene copolymer is ethylene/alkyl acrylate/CO terpolymer or ethylene/vinyl acetate/CO terpolymer.

11. The article of claim 9 in the form of a substantially planar film or sheet.

12. The article of claim 8 further comprising a substrate including cellular foam, woven fabrics, non-woven fabrics, or fiberglass wherein the substrate adhered to or in contact with a film or sheet of the blend.

13. The article of claim 12 wherein the substrate comprises a fabric selected from the group consisting of nonwoven polypropylene, nonwoven polyethylene, nonwoven polyethylene terephthalate; woven polyethylene terephthalate, woven polypropylene, woven polyethylene, spunbond polypropylene, spunbond polyester, or combinations of two or more thereof.

14. The article of claim 13 including a roofing membrane, pond liner, water reservoir liner, geomembrane, vial, cap, syringe, container, fuel tank, tray, tubing, filament, or pipe.

15. The article of claim 11 wherein article is a thermoformed article including vial, cap, syringe, container, tray, pipe, or tubing.

16. The article of claim 4 wherein the article has a hollow portion capable of containing a product.

17. The article of claim 8 wherein the article is a top layer of a roofing membrane.

18. The article of claim 17 wherein the roofing membrane further comprises an inner reinforcing layer and a bottom layer; the inner layer comprises a substrate; the substrate is a fabric; the bottom layer comprises a thermoplastic resin; and the top layer refers to the layer of a roofing membrane that is applied farthest from a roof decking.

* * * * *